United States Patent [19]

St. Clair

[11] Patent Number: 4,817,363
[45] Date of Patent: Apr. 4, 1989

[54] FITMENT INSERTER MACHINE
[75] Inventor: David L. St. Clair, Toledo, Ohio
[73] Assignee: Owens-Illinois Plastic Products Inc., Toledo, Ohio
[21] Appl. No.: 92,095
[22] Filed: Sep. 2, 1987
[51] Int. Cl.⁴ .............................................. B65B 7/28
[52] U.S. Cl. ...................................... 53/307; 53/300; 53/319
[58] Field of Search ................. 29/773, 789, 801, 809; 53/300, 306, 307, 308, 309, 319, 264, 314; 198/377, 378, 441

[56] References Cited

U.S. PATENT DOCUMENTS

| | | | |
|---|---|---|---|
| 2,823,816 | 2/1958 | Eddison | 198/377 |
| 3,392,505 | 7/1965 | Luther | 53/307 |
| 4,095,390 | 6/1978 | Knudsen | 53/300 X |
| 4,307,557 | 12/1981 | Shimizu et al. | 53/309 X |
| 4,563,855 | 1/1986 | Smith et al. | 53/300 X |
| 4,696,143 | 9/1987 | Young | 53/307 X |
| 4,716,708 | 1/1988 | Ochs | 29/773 X |

FOREIGN PATENT DOCUMENTS

| | | | |
|---|---|---|---|
| 1177963 | 9/1964 | Fed. Rep. of Germany | 53/264 |
| 1561995 | 7/1970 | Fed. Rep. of Germany | 53/306 |
| 1966353 | 10/1972 | Fed. Rep. of Germany | 53/307 |
| 1257055 | 9/1986 | U.S.S.R. | 53/319 |

*Primary Examiner*—P. W. Echols
*Assistant Examiner*—Andrew E. Rawlins

[57] ABSTRACT

A fitment inserter machine, such as a machine for inserting a spout into the top opening of a blow molded container is disclosed. A conveyor continually moves containers through the machine. A transfer arm and rotary placer removes the lowermost spout from a vertical dispenser and places the spout on a moving container. Jaws grasp the container finish while it is still moving and hold the finish while a pressing head mounted on a flying table moves downwardly to press the spout into correct alignment with the container.

20 Claims, 19 Drawing Sheets

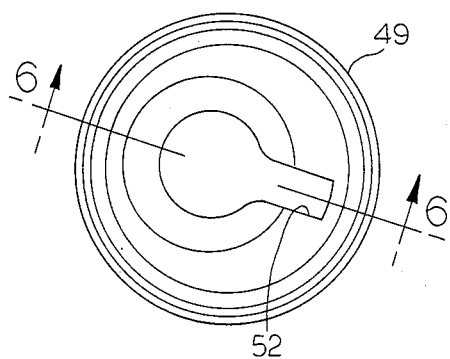 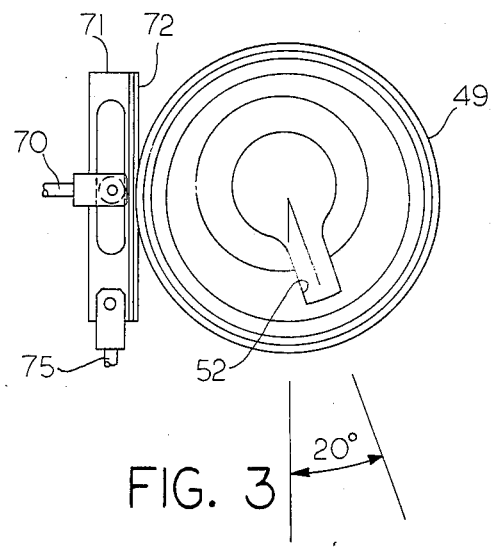
FIG. 2　　　　　FIG. 3
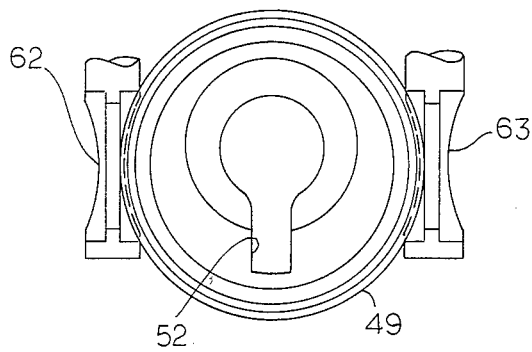 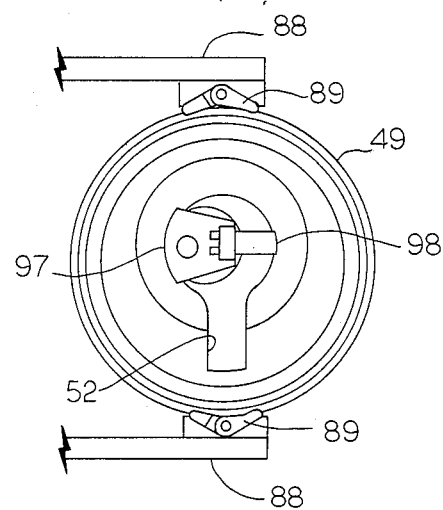
FIG. 4　　　　　FIG. 5
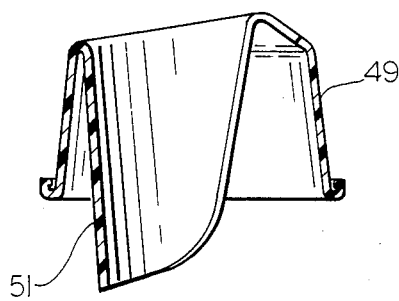 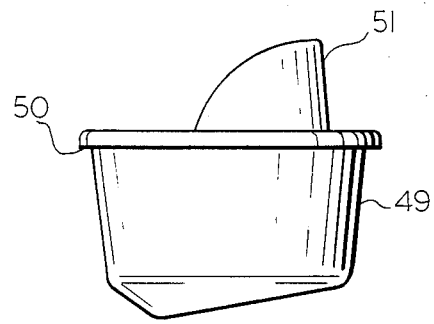
FIG. 6　　　　　FIG. 7

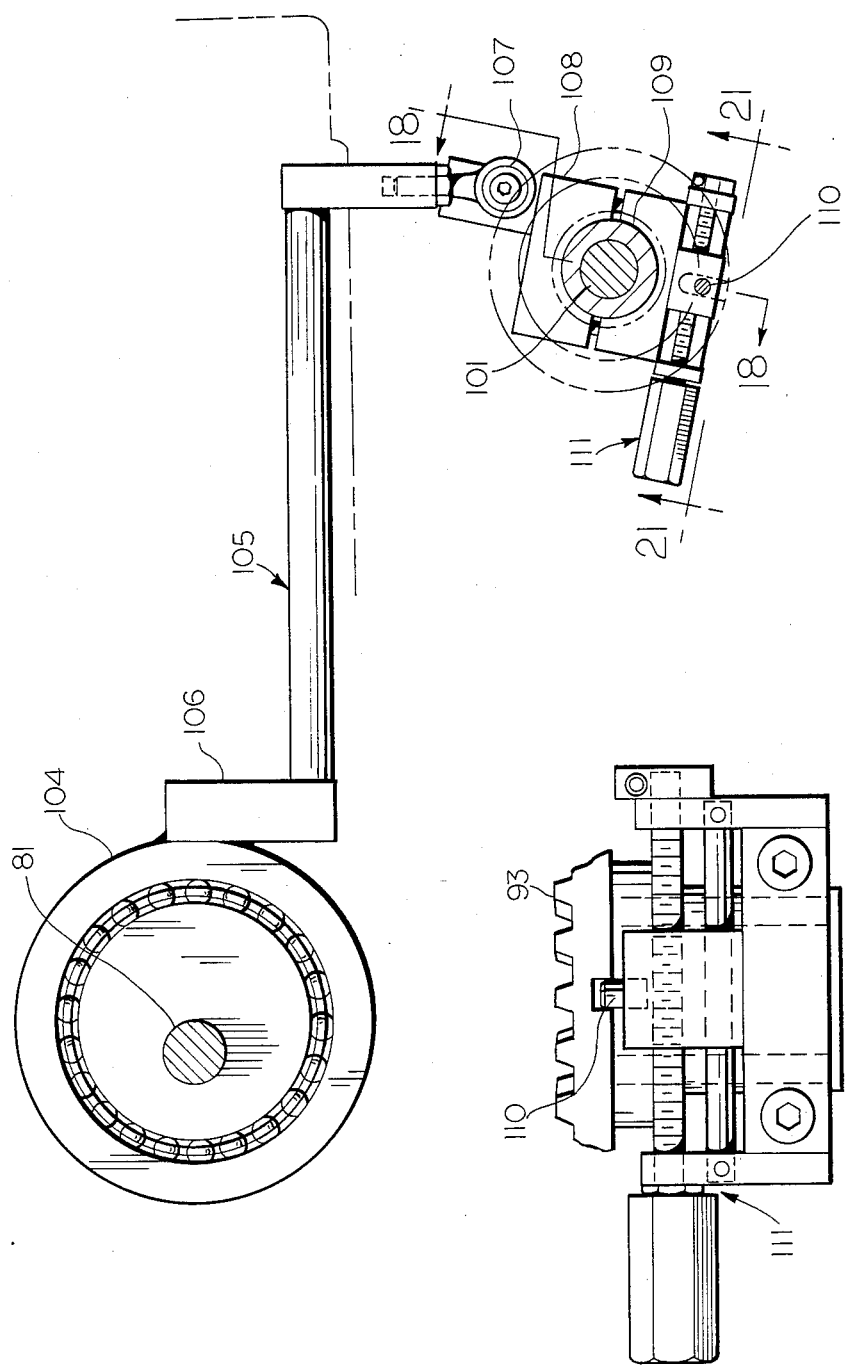

4,817,363

1

FITMENT INSERTER MACHINE

BACKGROUND OF THE INVENTION

The present invention is directed to a fitment inserter machine and particularly to a machine for inserting a spout into the top opening of a blowmolded plastic container. Blow-molded containers having either integral or separable spouts at their upper end are known in the art. When the spout is separable, it must be aligned and pressed into place accurately in the top of the container.

In prior machines, failures sometimes occurred because in a high production operation the container finish must be supported during the pressing operation or deformation occurs. Also, prior art machines were often slow since the container conveyor had to be stopped during the alignment of the spout in the container opening and also during the pressing operation.

SUMMARY OF THE INVENTION

The fitment inserter machine, according to the present invention, maintains orientation of the insert or spout with the container and also matches the speed of the container while synchronizing the spout position with the container. During the pressing operation, jaws support the finish of the container during pressing to prevent pressing pressure from flexing or collapsing the container finish. A stop/start operation is not required and the pressing operation occurs while maintaining the speed of the containers as they move through the fitment inserter machine.

The fitment inserter machine includes conveyor means for serially and continuously moving a plurality of containers through the machine. Placer means remove a fitment or spout from a vertical stack after alignment and places the spout at the container opening, while the container continues to move. A head presses the spout into the container while mating jaws grasp and hold the container finish during the pressing of the spout into position in the container opening.

BRIEF DESCRIPTION OF THE DRAWINGS

FIG. 2 is a view of a fitment, in this case a plastic insert spout for a blowmolded bottle, taken along the line 2—2 of FIG. 1 and shown on an enlarged scale;

FIG. 3 is a view similar to FIG. 2 taken along the line 3—3 of FIG. 1;

FIG. 4 is a view similar to FIG. 2 taken along the line 4—4 of FIG. 1;

FIG. 5 is a view similar to FIG. 2 taken along the line 5—5 of FIG. 1;

FIG. 6 is a cross-sectional view taken along the line 6—6 of FIG. 2;

FIG. 7 is an elevational view of the fitment shown in FIG. 2;

FIG. 20 is a front elevational view, with parts removed for clarity, taken generally along the line 20—20 of FIG. 18;

FIG. 21 is a cross-sectional view, taken along the line 21—21 of FIG. 20, and shown on an enlarged scale;

DESCRIPTION OF THE PREFERRED EMBODIMENTS

Figure 1:
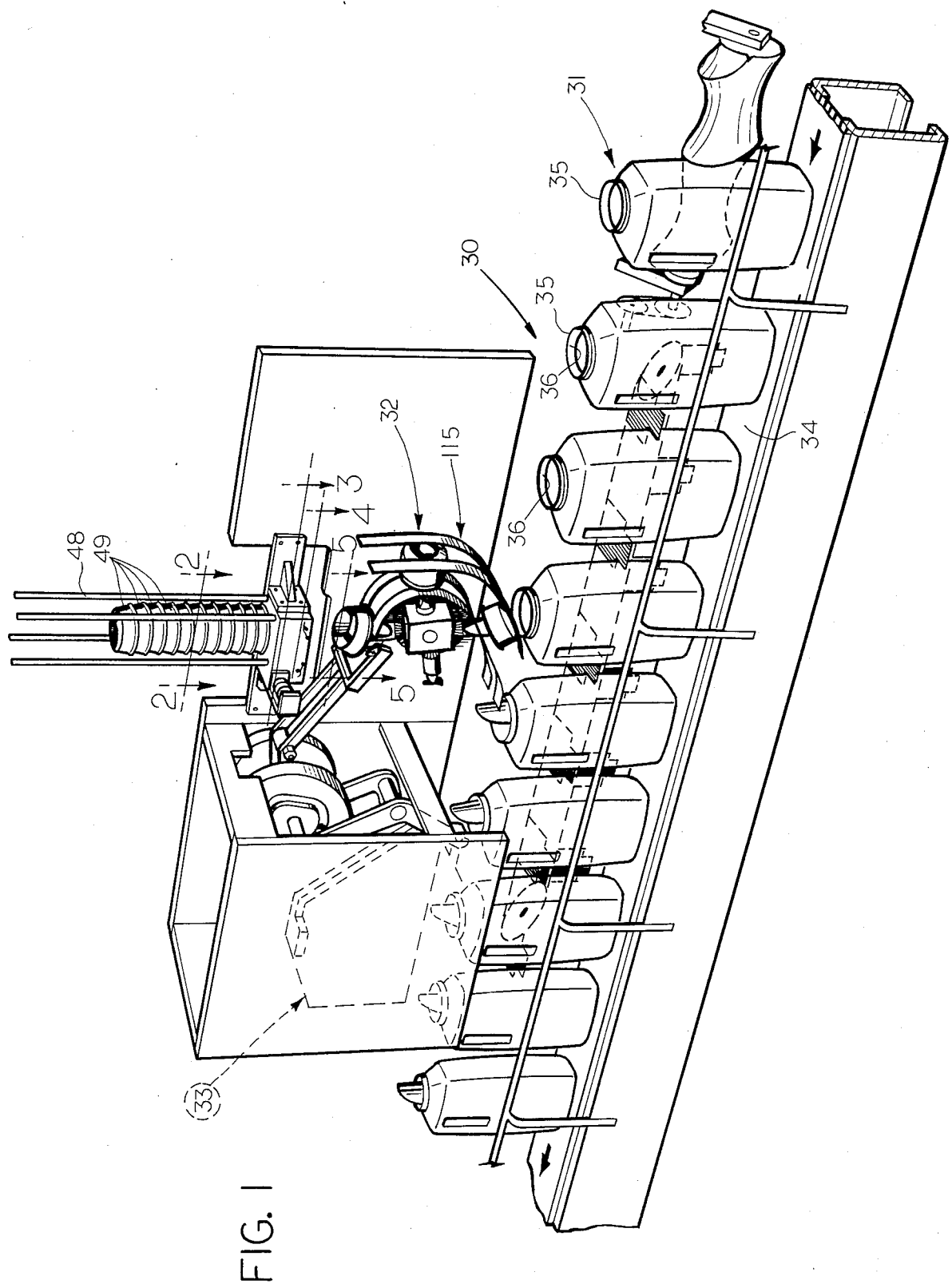
FIG. 1 is a perspective view of a fitment inserter machine, according to the present invention.
Figure 10:
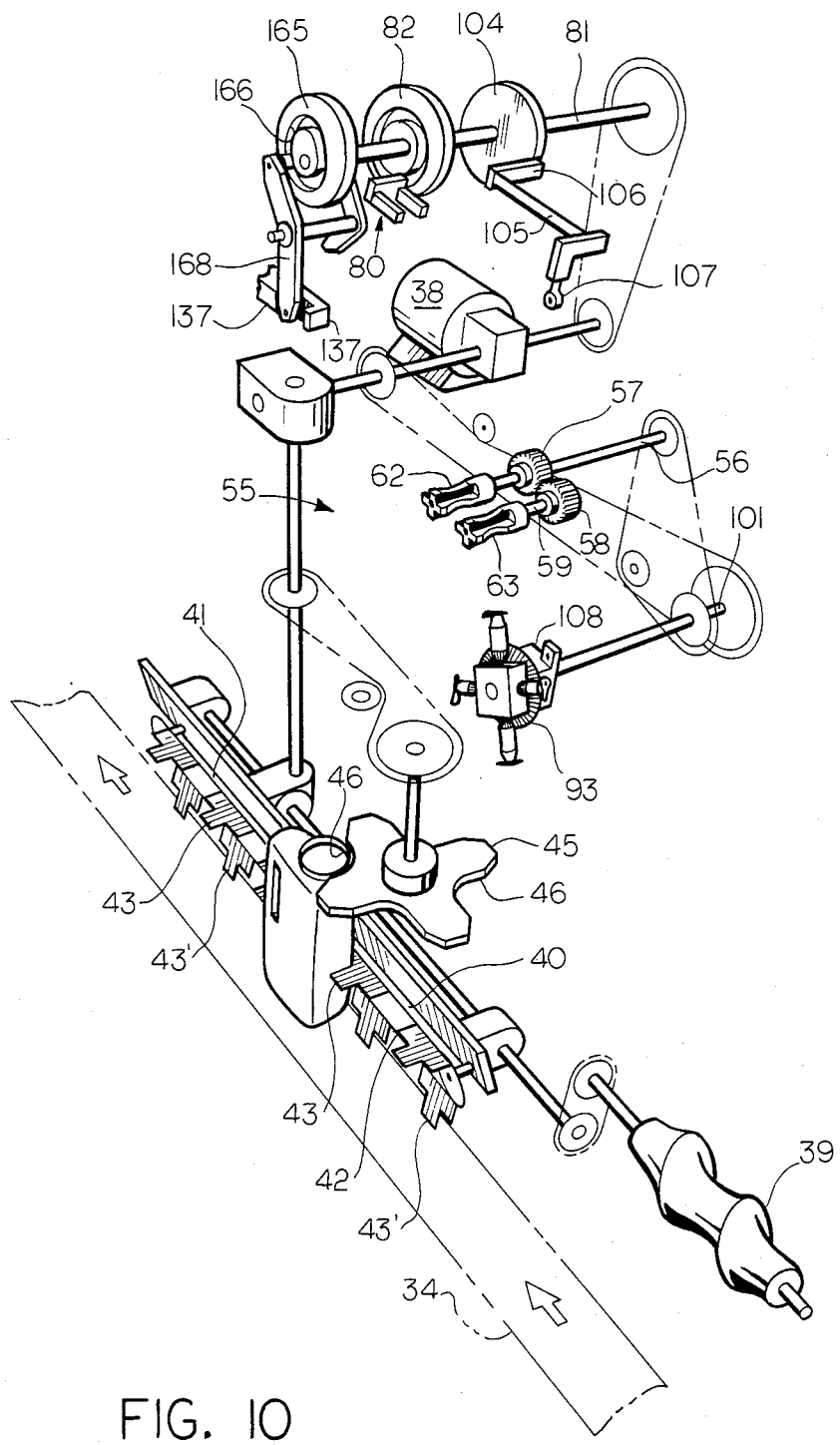
FIG. 10 is an exploded view showing several of the drive components of the fitment inserter machine, with some of the mechanisms shown out of position for clarity.

Referring to FIG. 1, a fitment inserter machine, according to the present invention, is generally indicated by the reference number 30. The machine 30 includes conveyor means 31, placer means 32 and pressing means 33. The conveyor means 31 includes a continuous belt conveyor 34 for transporting a plurality of containers 34. In the present embodiment, the containers 35 are blow-molded plastic containers having a threaded opening 36 defined in their upper ends. Referring to FIG. 10, the fitment inserter machine 30 has many components driven by a motor 38. One of the components driven by the motor 38 is a rotating screw member 39 which is positioned adjacent the belt conveyor 34. The screw member 39 serves as a bottle separator for spacing the containers 35 as they travel toward the placer means 32. Referring to FIGS. 1 and 10, a secondary spacer mechanism is positioned downstream of the screw member 39. This includes a continuous endless belt 40 having an upper flight 41 and a lower flight 42. The endless belt 40 is also driven by the motor 38 and includes a plurality of spacer members 43 which extend horizontally outwardly throughout the upper flight and are moved downwardly while on the lower flight 42 as indicated by the reference number 43'. When the spacer members 43 are in the 43' position, they do not interfere with the successive containers 35 moving along the belt conveyor 34. As shown in FIGS. 1 and 10, the spacer members 43 abut the adjoining containers 35 to maintain the containers 34 in their correct spacig.

In the present embodiment, a driven star wheel 45, powered by the motor 38 is positioned adjacent the continuous belt 34. The star wheel 45 defines recesses 46 on its surface for receiving and aligning the upper ends of the containers 35, as best shown in FIG. 10.

Figure 9:
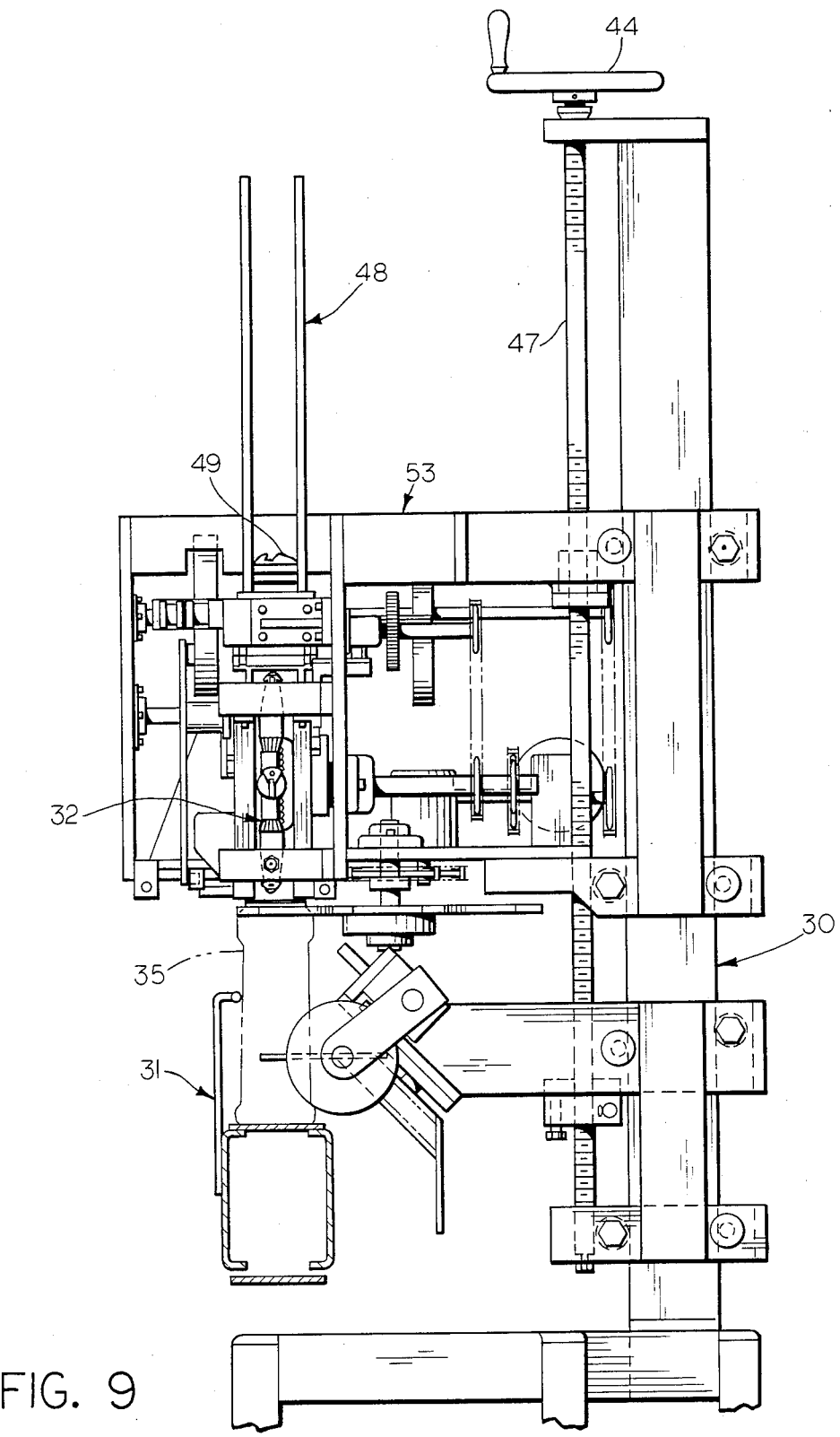
FIG. 9 is an end view of the fitment inserter machine shown in FIG. 8 and taken on an enlarged scale.

Referring to FIG. 9, a handwheel 44 is connected to a threaded shaft 47 which is operatively connected to an upper frame portion 53 of the machine. The upper frame portion 53 mounts the placer means 32 and the pressing means 33. Rotation of the handwheel 44 vertically moves the upper frame portion 53 adjusting the spacing relative to the conveyor means 31. This adjustment is used when containers of different size are run on the machine 30.

Referring to FIG. 1, the fitment inserter machine 30 includes a vertical dispenser 48 for holding a vertical stack of fitments, for example the pouring spout fitments 49, best shown in FIG. 7. Each spout 49 includes a rim 50 which is pressed downwardly against the container 35 after the spout 49 is positioned in the container opening 36 as described subsequently.

FIG. 7 shows the spout 49 in its orientation upon insertion into the container opening 36. As the spouts 49 move downwardly in the vertical dispenser 48, they are 180° reversed from the FIG. 7 position and have the upside down orientation shown in FIG. 6. Generally, as the spouts 49 move downwardly in the vertical dispenser 48, when viewing from the top, they have the appearance shown in FIGS. 2-5. The spout 49 includes a pouring member 51 which defines an elongated opening 52 therethrough.

Figure 13:
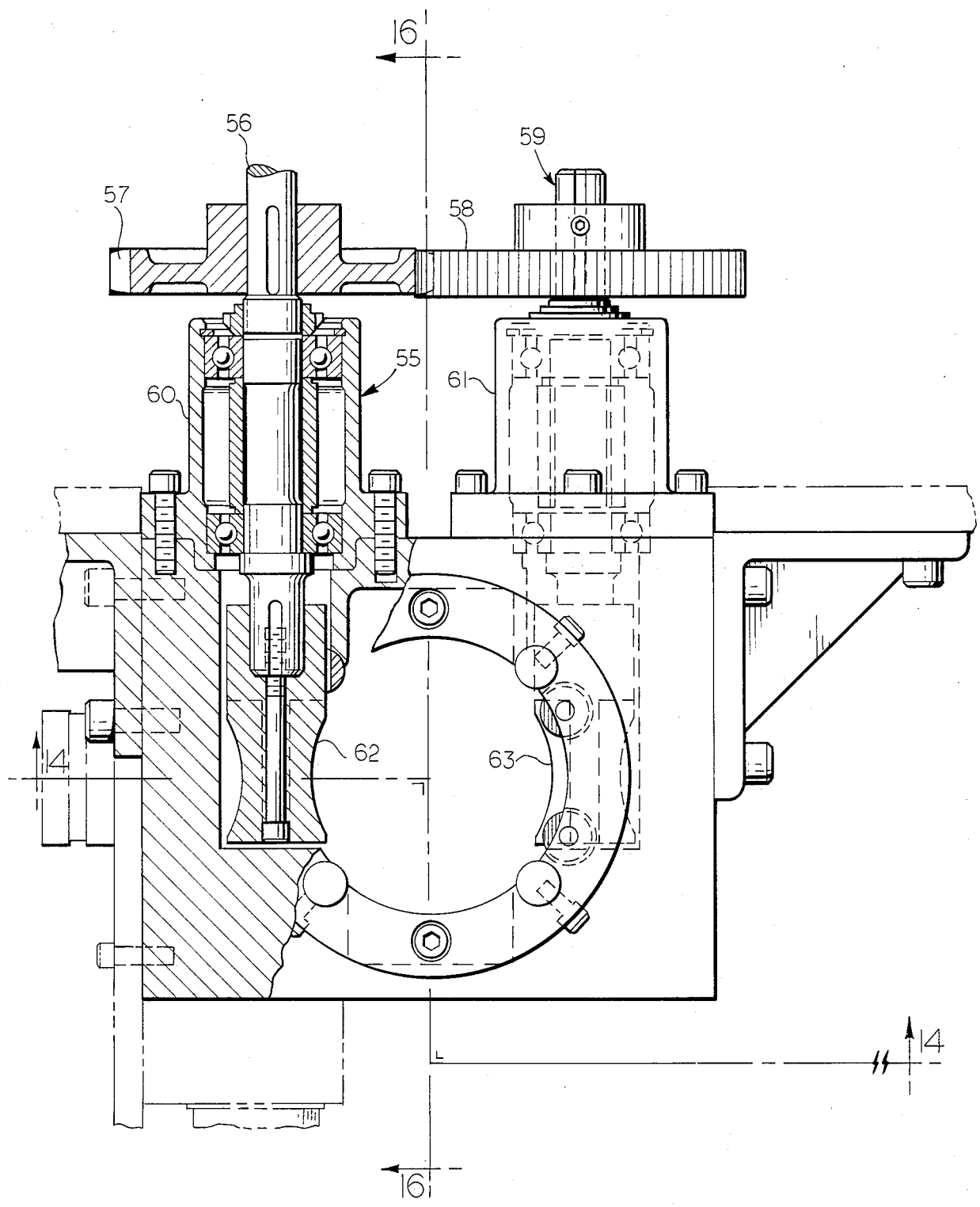
FIG. 13 is a top view, shown partially in cross section and showing drive rollers for moving spouts downwardly through the vertical dispenser.
Figure 14:
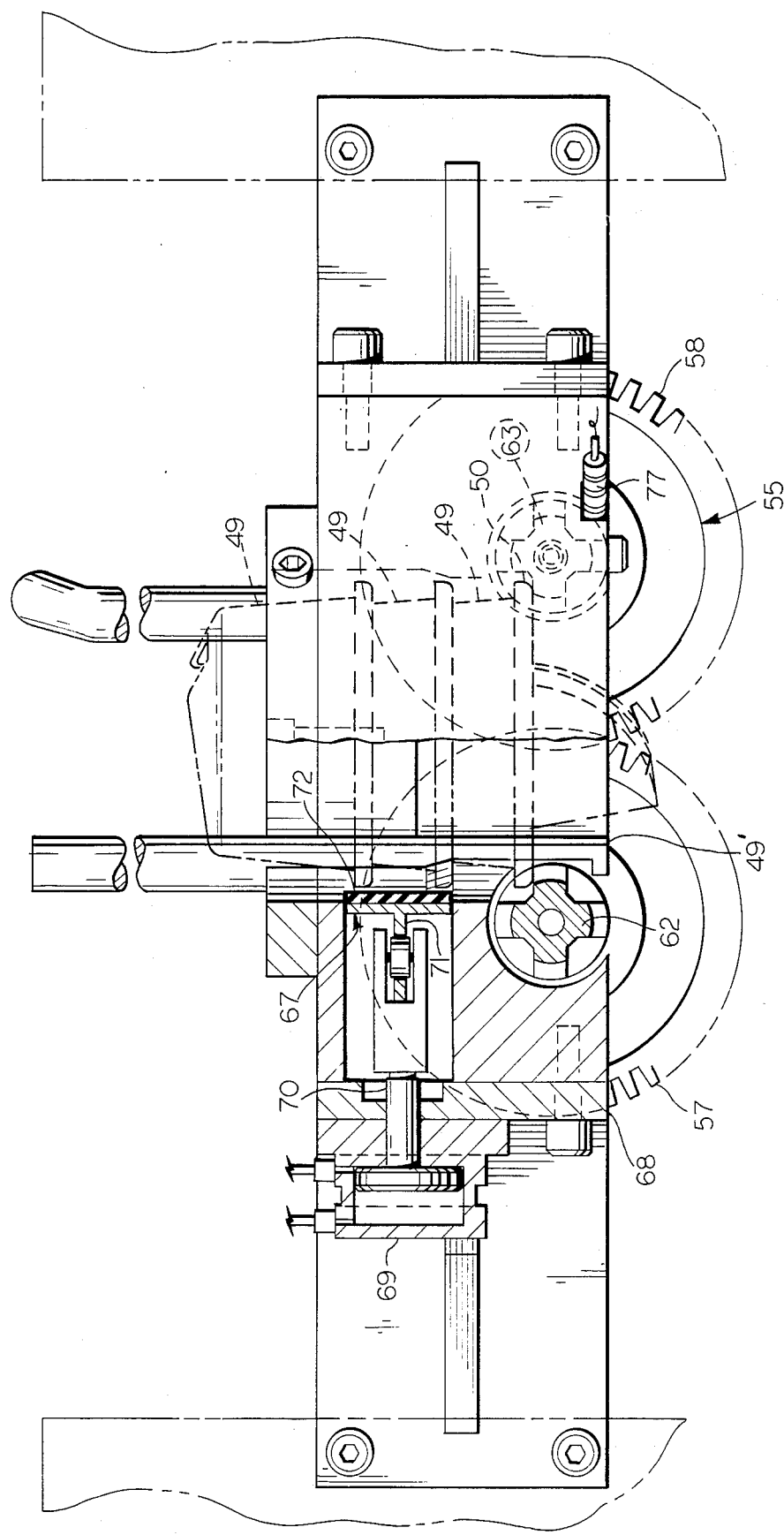
FIG. 14 is a cross-sectional view taken through the line 14—14 of FIG. 13.

Referring to FIGS. 10, 13 and 14, roller means for moving the spouts 49 downwardly through the dispenser 49 is generally indicated by the reference number 55. The roller means 55 is driven through a shaft 56 operatively connected to the motor 38. A gear 57 is mounted on the shaft 56 and mates with a gear 58 mounted on a stub shaft 59. Journals 60 and 61 are provided for the shafts 56 and 59, respectively. A roller 62 is mounted on the shaft 56 and a roller 63 is mounted on the shaft 59. Rotation of the driven shaft 56 rotates the rollers 62 and 63 to engage the rim 50 of the spouts 49 and urge the spouts 49 downwardly as indicated in FIG. 14.

Figure 15:
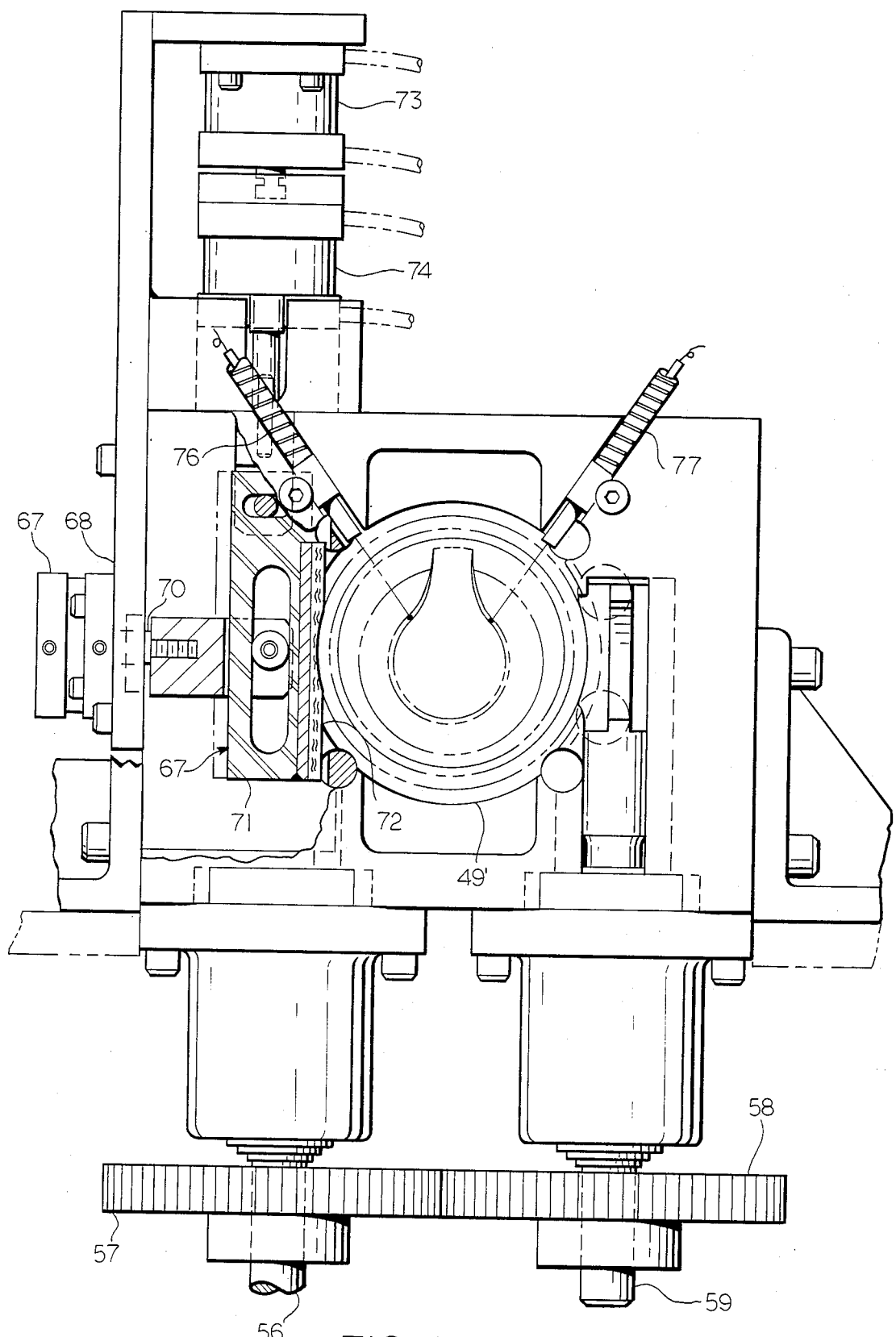
FIG. 15 is a view similar to FIG. 13 and showing the bottom view.
Figure 16:
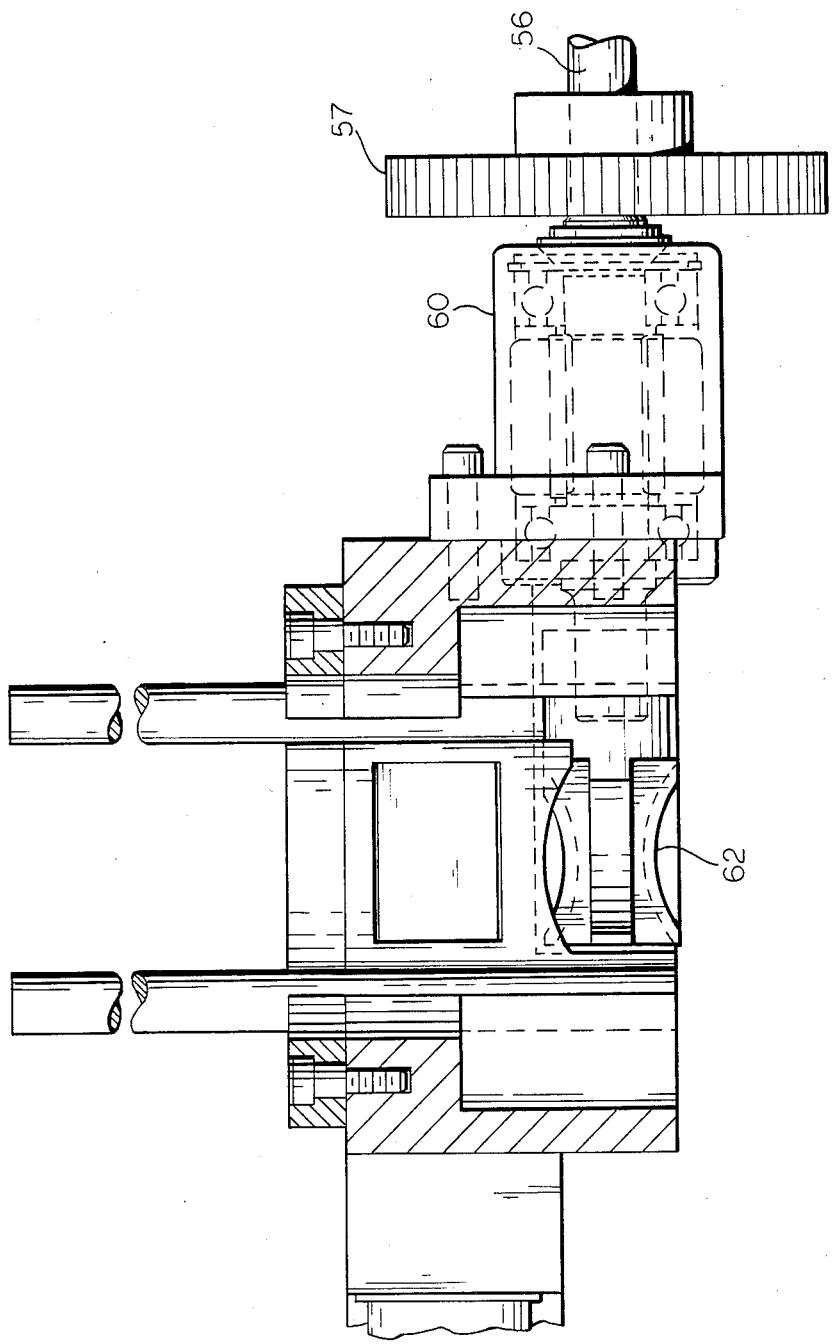
FIG. 16 is a cross-sectional view taken along the line 16—16 of FIG. 13.
Figure 17:
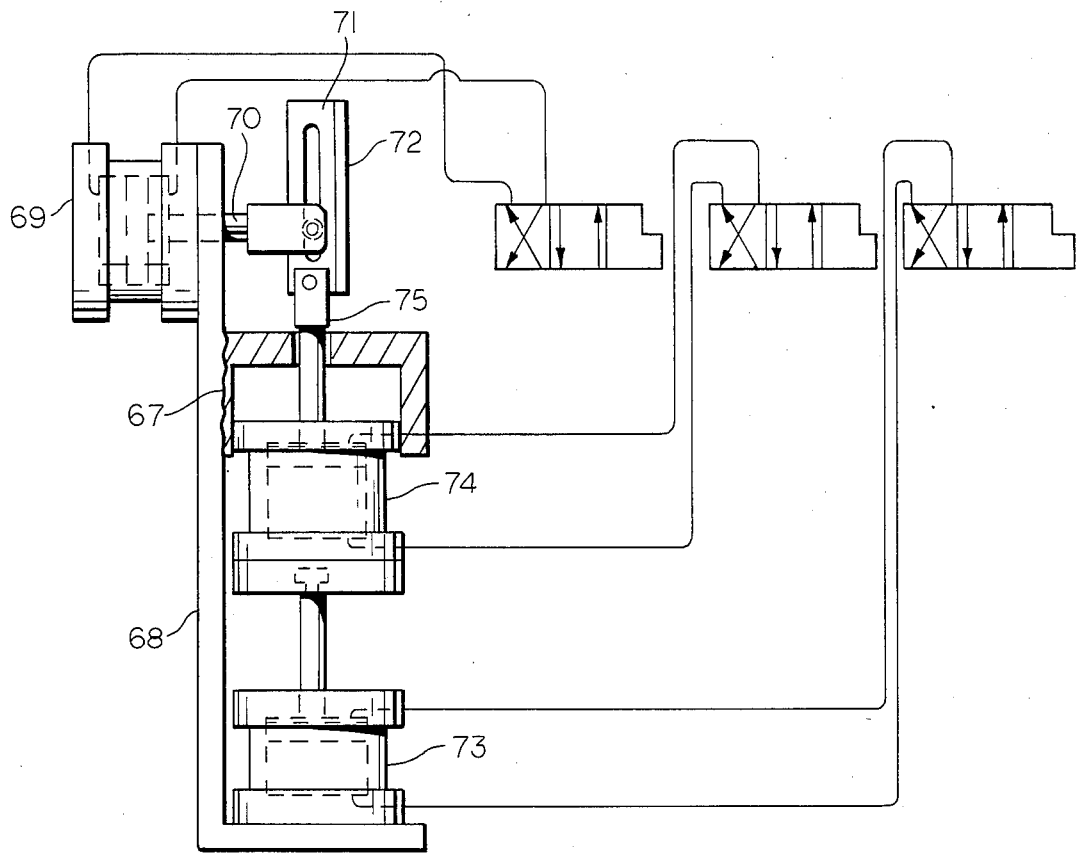
FIG. 17 is a schematic view showing the driving cylinders and the cylinder valving of the alignment means.

Referring to FIGS. 14, 15 and 17 an aligning means for rotating the lowermost fitment or spout 49' to a correct alignment is generally indicated by the reference number 67. Referring to FIG. 17, the alignment means 67 includes an L-shaped bracket 68 which mounts a positioning cylinder 69 having a rod 70. The rod 70 is operatively connected to an alignment member 71 having a friction pad 72 for engagement with the spouts 49. The bracket 68 also mounts tandem cylinders 73 and 74 having a rod 75. The rod 75 is also connected to the alignment member 71 and reciprocates the alignment member 71 horizontally along a tangent of one of the spouts 49. During acuation, the rod 70 of the cylinder 69 is extended to pivot the fricton pad 72 of the alignment member 71 into engagement with the sidewall of the spout 49, as indicated in FIG. 15. Optical sensors 76 and 77 sense the position of the lowermost spout 49'. Based upon the reading of the sensors 76 and 77 the tandem cylinders 73 and 74 are extended or retracted to horizontally reciprocate the alignment member 71 and place the lowermost spout 49' in its correct alignment. FIG. 3 diagrammatically illustrates how the fitment or spout 49 may be rotated through an arc of 20° by reciprocating the alignment member 71.

Figure 8:
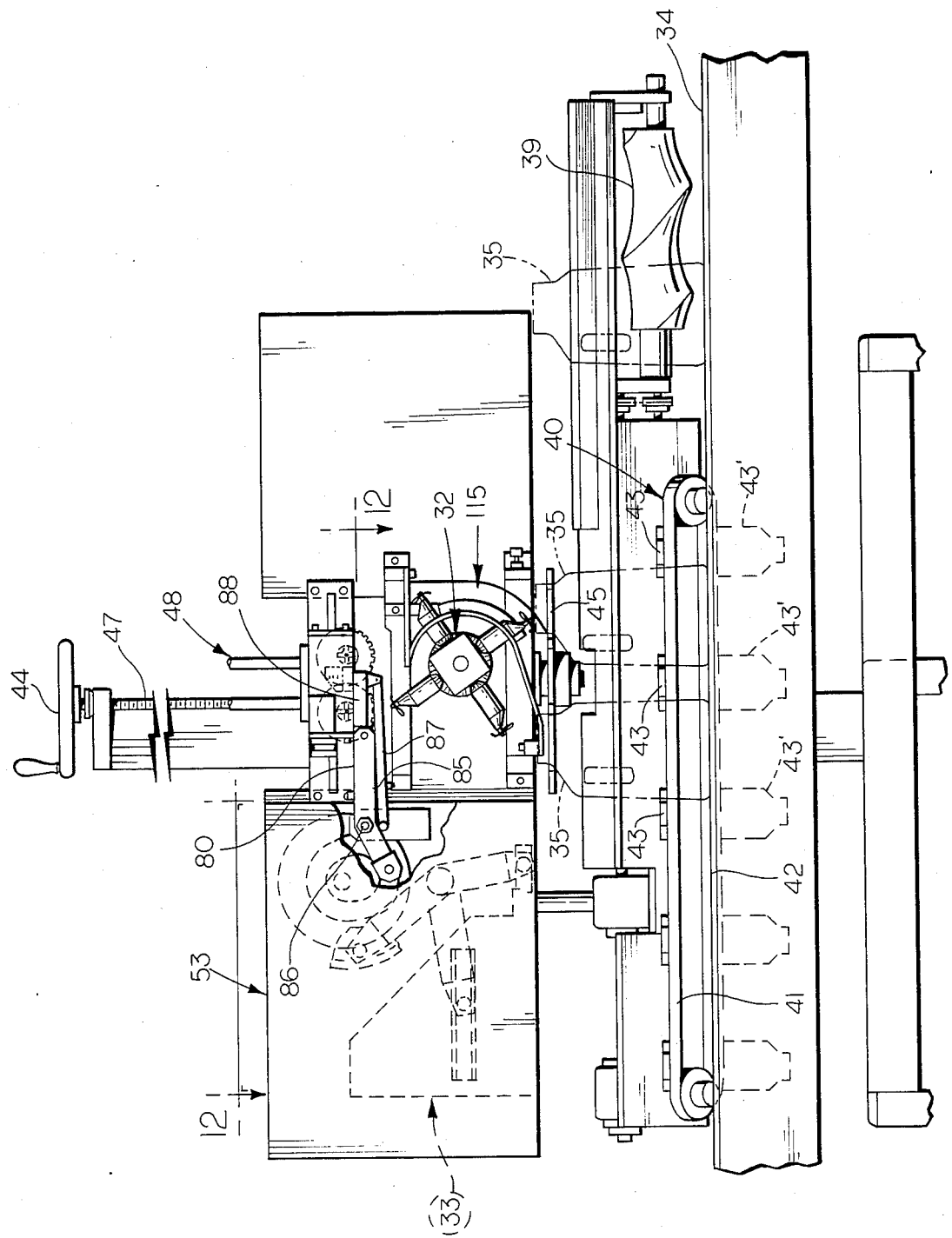
FIG. 8 is front elevational view of the fitment inserter machine, according to the present invention.
Figure 11:
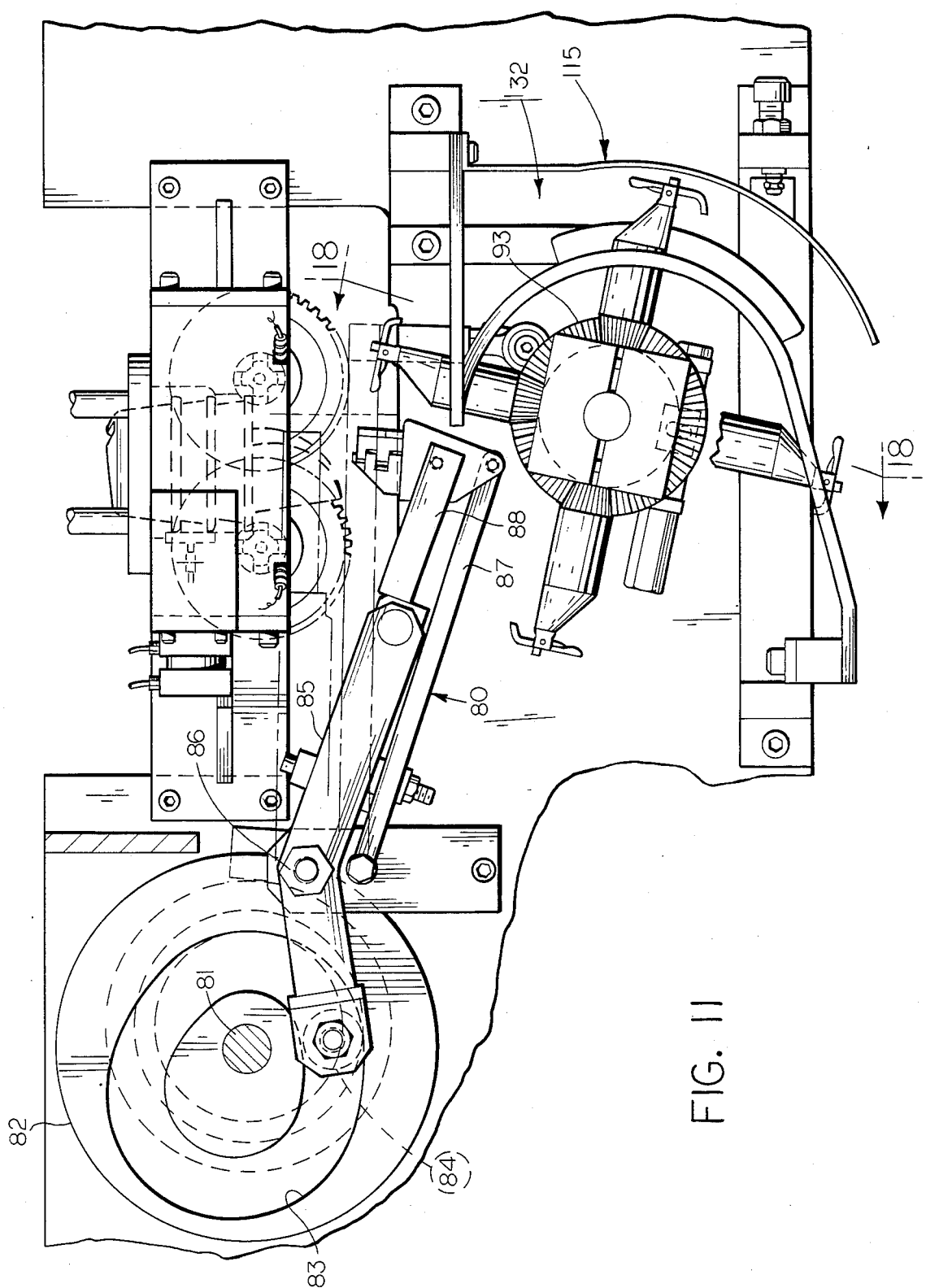
FIG. 11 is a fragmentary, elevational view, with parts removed for clarity, showing the placer means of the fitment inserter machine.
Figure 12:
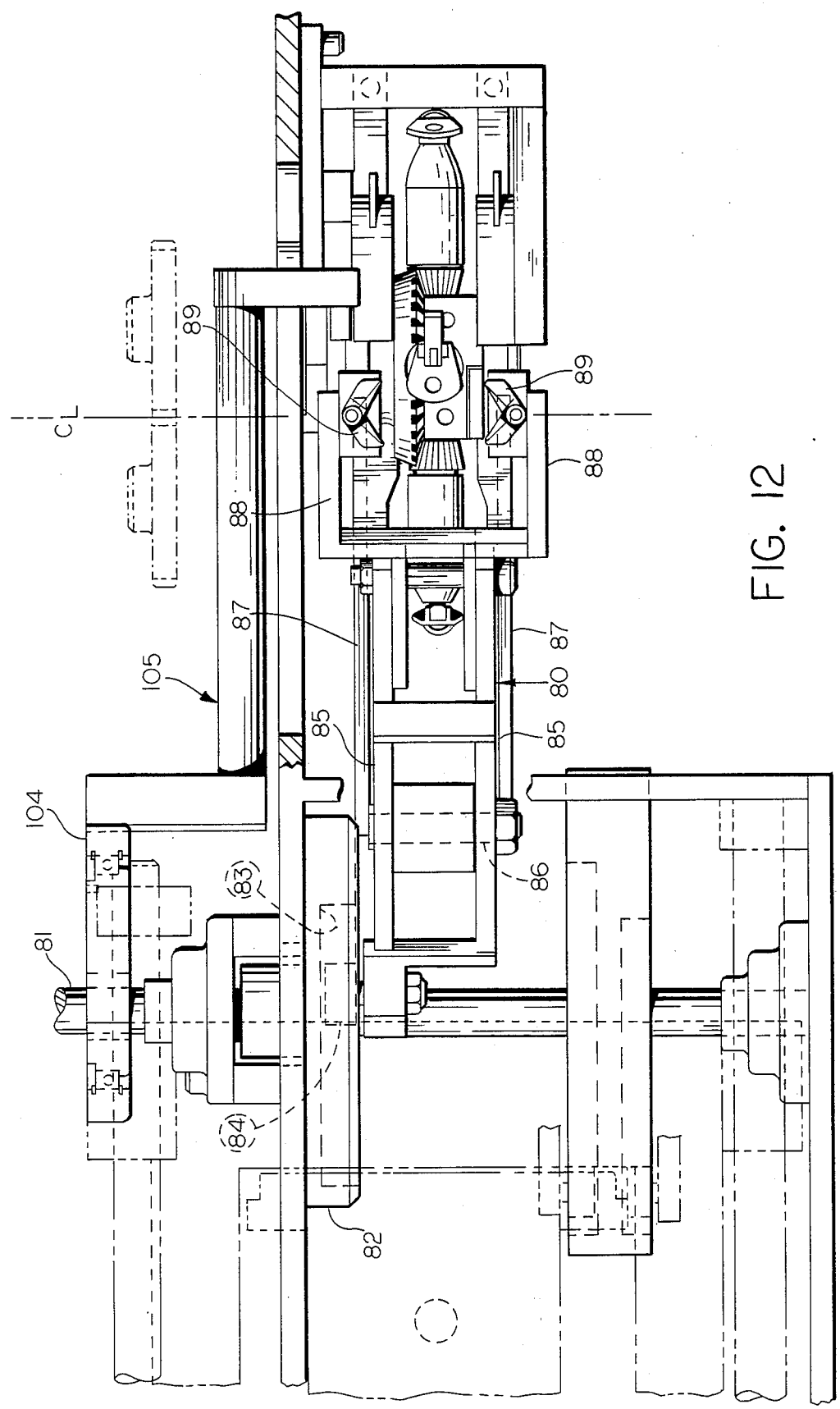
FIG. 12 is a top view taken along the line 12—12 of FIG. 8 and shown on an enlarged scale.

A transfer arm assembly is generally indicated in FIGS. 8, 11, and 12 by the reference number 80. The transfer arm 80 is driven by the motor 38 through a shaft 81 which mounts a cam member 82. The cam member 82 defines a cam recess 83 which receives a follower 84 mounted on one end of the transfer arm assembly 80. The transfer arm assembly 80 includes opposed parallel main links 85 which pivot on a pivot pin 86. Lower links 87 are mounted adjacent the main links 85 and form a parallelogram linkage with the main links 85. A transfer head 88 having opposed transfer supports 89 at its outermost end, is connected to both the main links 85 and the lower links 87. The transfer supports 89 receive the lowermost spout 49' and transfer such spout to the placer means 32.

The placer means 32, referring to FIGS. 8, 11, 18 and 19, includes a main or bevel gear 93. A plurality of planetary spindle assemblies 94 having mating gears 95 are mounted on the bevel gear 93. Each of the planetary spindle assemblies 94 includes an outer end 96 which receives the lowermost spout 49' as it is lowered downwardly by the transfer arm assembly 80. Pivotal fingers 97 and 98 are mounted adjacent the outer end 96 of each planetary spindle assembly 94 for receiving and maintaining the lowermost spout 49' in the correctly aligned position.

Figures 18, 19:
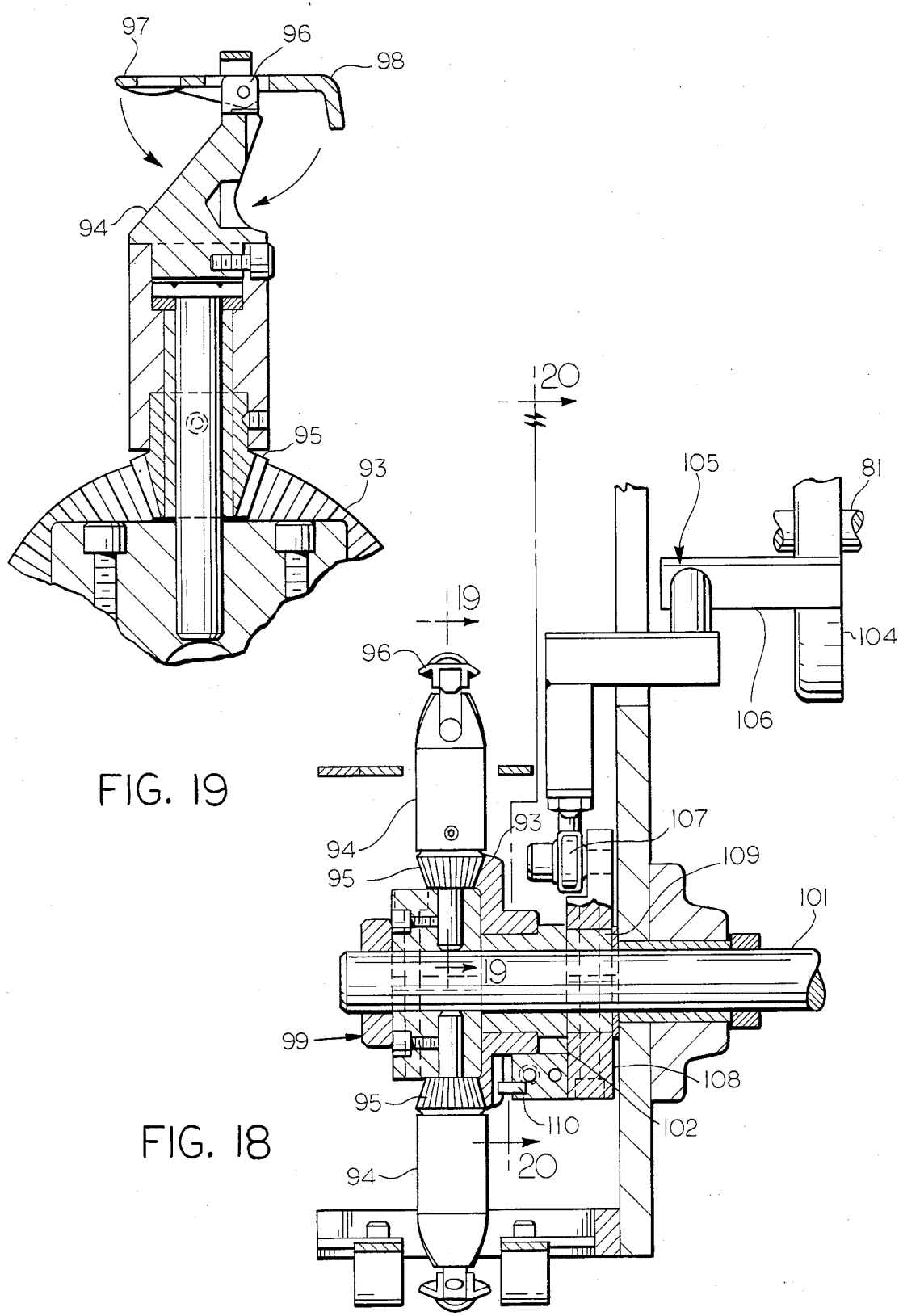
FIG. 18 is a cross-sectional view, shown on an enlarged scale taken along the line 18—18 of FIG. 11.
FIG. 19 is a fragmentary, cross-sectional view taken along the line 19—19 of FIG. 18.
Figure 22:
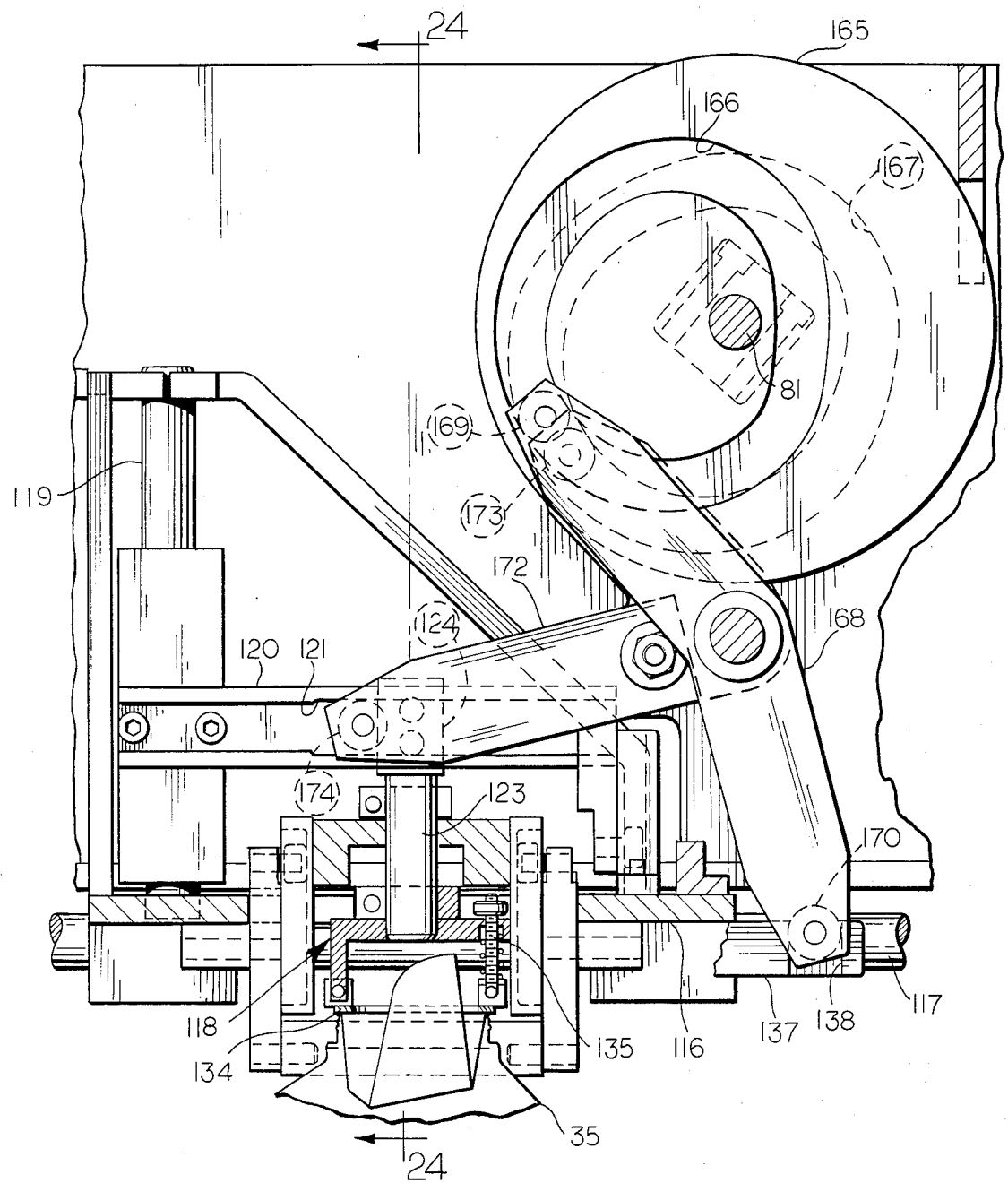
FIG. 22 is a fragmentary front elevational view, shown on an enlarged scale and showing the pressing means of the fitment inserter machine, according to the present invention.

Delay means are provided in the fitment inserter machine 30, according to the present invention, for adjusting the relative speed of rotation of the spindle assemblies 94 with respect to the bevel gear 93. As best shown in FIG. 18, the spindle assemblies 94 are rotatably mounted on a hub 99 which is mounted on a shaft 101. The shaft 101 is driven by and operatively connected to the motor 38. For each rotation of the shaft 101 the spindle assemblies rotate four times. The bevel gear 93 is mounted on a sleeve 102 and is normally stationary with respect to the mating gears 95 during their rotation. As a planetary spindle assembly 94 moves from the up position where it receives the spout to its lower position where it deposits the individual spout 49 in the opening 36 of an individual container 35, the spout is rotated to the orientation shown in FIG. 7.

The delay or intermittent motion means slows the movement of an individual spindle assembly 94 at the time of depositing its spout 49 at a container opening 36. Because the containers 35 are still moving along the conveyor 34 as the spouts 49 are placed in the container openings 36, the delay ensures correct positioning when the spouts 49 are dropped.

The delay means includes an eccentric 104 mounted on the shaft 81. A follower arm assembly 105 includes an end 106 adjacent the eccentric 104. A swivel connection 107 is mounted on the other end of the follower arm assembly 105 and is pivotally connected to a drive member 108 which is mounted for rotation by a bearing 109 on the shaft 101. As best shown in FIG. 18, the drive member 108 is connected by a pin 110 to the bevel gear 93. A threaded adjustment screw assembly 111 (see FIGS. 20 and 21) mounts the pin 110 and provides for manual adjustment of the bevel gear 93 relative to the planetary spindle assemblies 94 and the mating gears 95. The delay means adjust the relative speed of rotation of the spindle assembly 94 relative to the bevel gear 93 immediately prior to the placement of the spout 49 on the container 35. The eccentric 104 acting through the follower arm 105 rotates the drive member 108 which transfers its movement through the connecting pin 110 to the bevel gear 93 to supply the changing relationship between the bevel gear 93 and the mating gears 95 to ensure the desired slowing or delay.

Referring to FIGS. 1, 8 and 11, a curvilinear guide chute assembly 115 is positioned adjacent the bevel gear 93 for receiving and guiding the spouts 49 as they are rotated downwardly from the vertical dispenser 48 to positioning on the containers 35.

The length of the arm assembly 105 and the stroke of the eccentric 104 are such that during the forward motion the spindle assembly 94 will stop rotation long enough to place the spout 49 into the mouth of the container 35 and allow the spindle assembly 94 to leave the spout 49. During the back or return motion the spindle assembly rotates 360 degrees.

The pivotal fingers 97 and 98 at the outer end 96 of each spindle assembly 94 are spring loaded. The finger 98 is relatively narrow and complementary with the width of the elongated opening 52 in the spout 49. The other finger 97 is relatively wide and rounded and fits the curve of the spout 49. The fingers 97 and 98 collapse to allow the narrow end of the spout 49 over the end of the spindle assembly 94. Because the spout 49, in the present embodiment, is conical shaped, it is wider at the end where the fingers 97 and 98 are located. The wide finger 97 keeps the spout 49 in the proper location so that the narrow finger 98 can find the elongated opening 52 in the spout 49; flip out; and drive the entire spout 49 around for placement in the container 35.

Referring to FIGS. 22-26, the pressing means 33 includes a flying platform or table 116 which is mounted for reciprocal movement by parallel bars 117. The table 116 reciprocates along the bars 117 to enable a pressing head 118 to move at the speed of the containers 35 during the pressing operation. A vertical support post 119 extends upwardly from the table 116 and slideably mounts a horizontal strut 120 which defines a track 121. The head 118 includes a shaft 123 which is mounted by a block 124 to the horizontal strut 120. A cross member 125 is fixed on the shaft 123 and mounts a pair of opposed cam members 126 and 127 at its ends. The cam member 126 defines cam slots 128 while the cam member 127 defines cam slots 129. The horizontal strut 120 also mounts a downwardly extending arm 130 having a roller 131 adjacent its lower end. The roller 131 is received in a vertical guide track 132 which extends upwardly from the table 116. A pressure ring 134 is operatively connected to the bottom of the shaft 123 and includes an adjusting member 135. Movement of the adjusting member 135 pivots the pressure ring 134 to ensure the correct pressing alignment when the pressure ring 134 engages the spouts 49 and snaps them into position in the containers 35.

A drive arm 137 having a drive recess 138 is mounted on and extends outwardly from the table 116. A pair of camming arms 140 having followers 141 mounted at one end are pivotally mounted to the table 116 adjacent a center opening 142 defined by the table 116. The followers 141 are received in the cam slots 128 of the cam member 126. Similarly, camming arms 144 having followers 145 are pivotally mounted at the other end of the table 116 adjacent the opening 142. The followers 145 are received by the cam slots 129 defined in the cam member 127.

Depending guide blocks 147 and 148 having curvilinear guide slots 149 and 150 are mounted below the flying table 116. A pair of jaws 152 and 153 are positioned below the table 116. The jaw 152 has a jaw member 154 which defines a threaded shape which mates with the finish on the containers 35. The jaw 153 has a similar jaw member 155. A roller 156 is mounted on the jaw 152 and a similar roller 157 is mounted on the jaw 153. The roller 156 is received in the guide slot 150 while the roller 157 is received in the guide slot 149. The camming arms 140 include pins 159 which are received in openings 160 defined by the jaws 152 and 153. Similarly, the camming arms 144 have pins 161 which are received in openings 162 defined in the opposite ends of the jaws 152 and 153.

Figure 23:
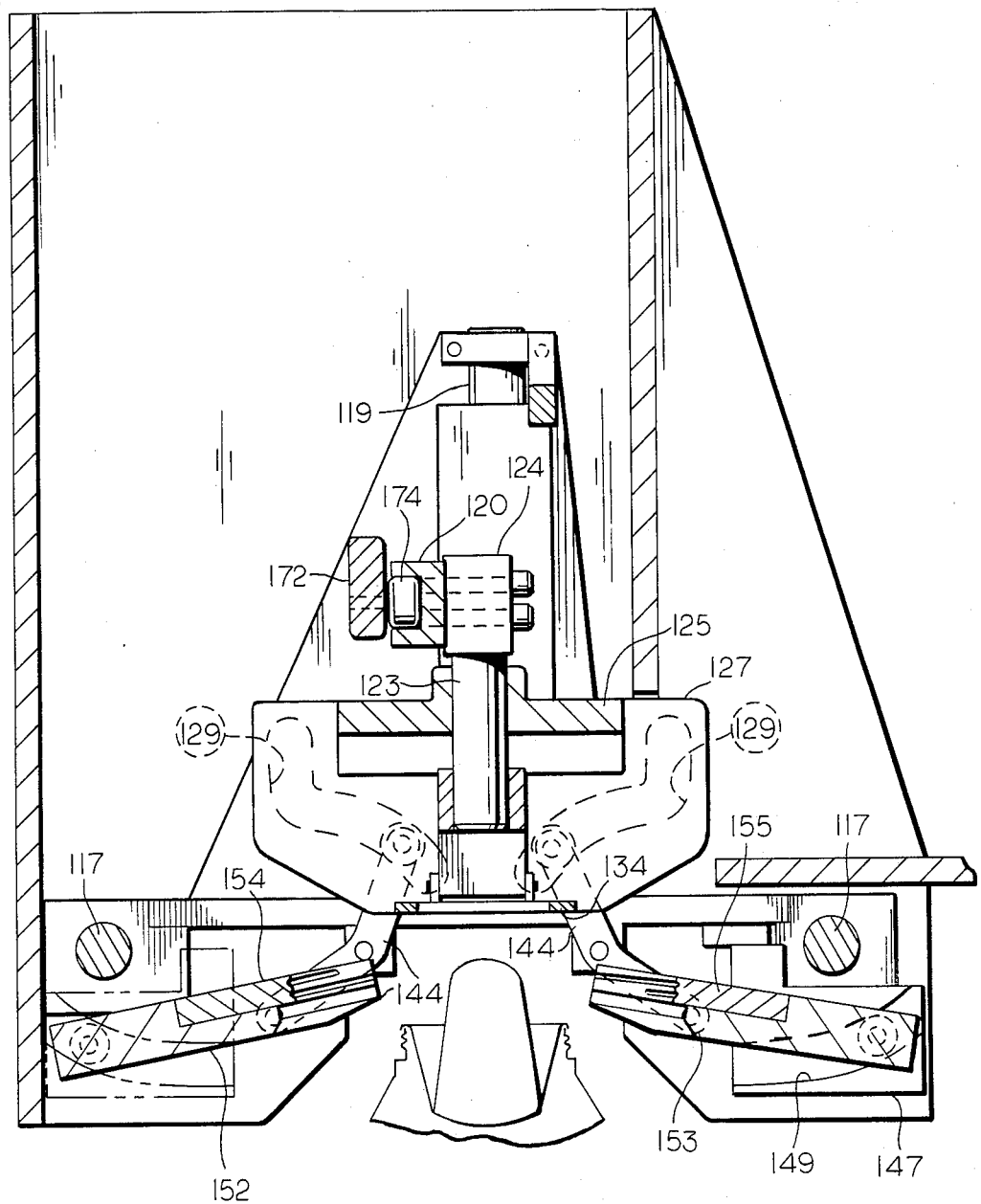
FIG. 23 is a cross-sectional view taken generally along the line 23—23 of Fig 22 and showing the position of the pressing mechanism prior to pressing.
Figure 24:
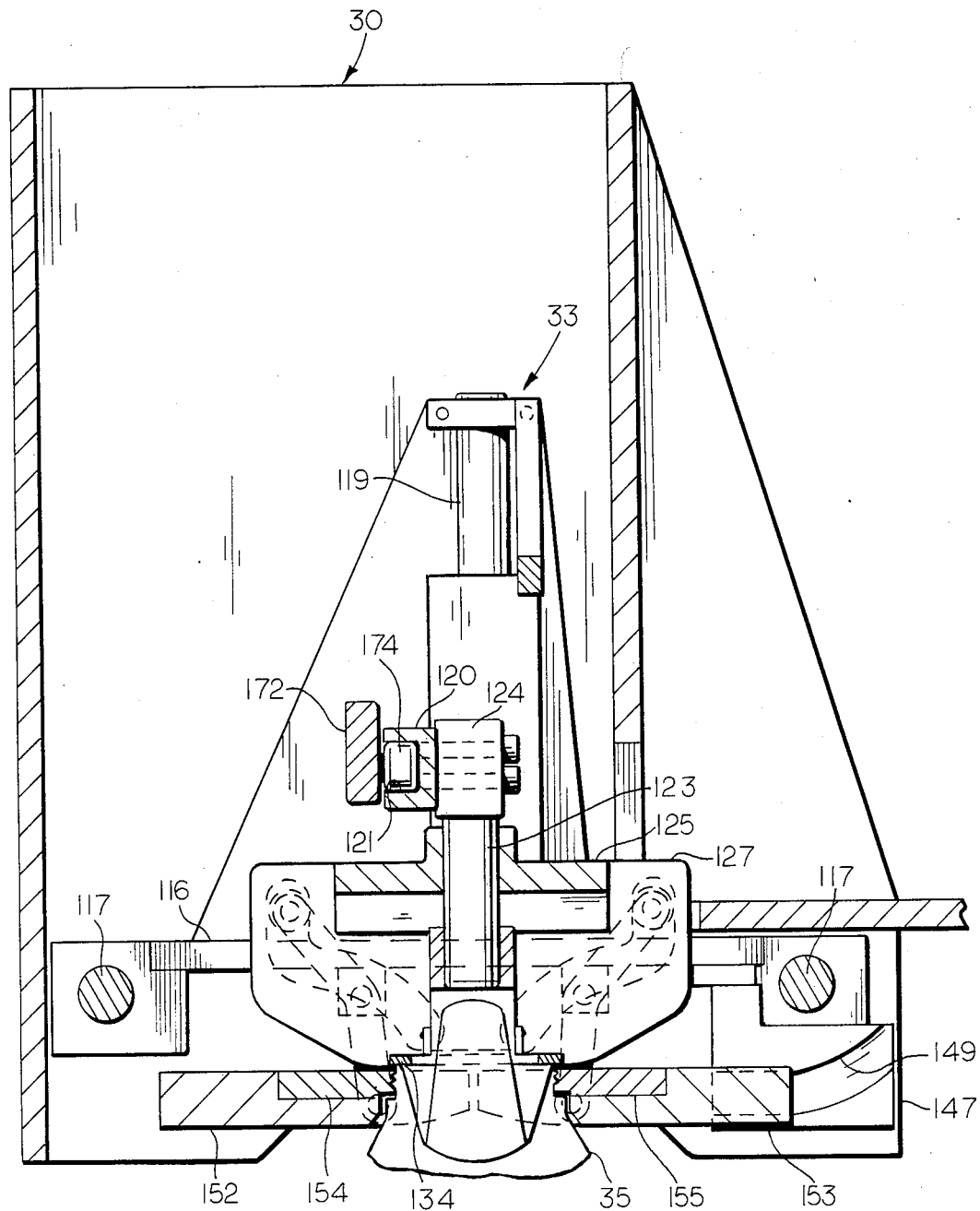
FIG. 24 is a view similar to FIG. 23 taken along the line 24—24 of FIG. 22 and showing the pressing means after pressing.
Figure 25:
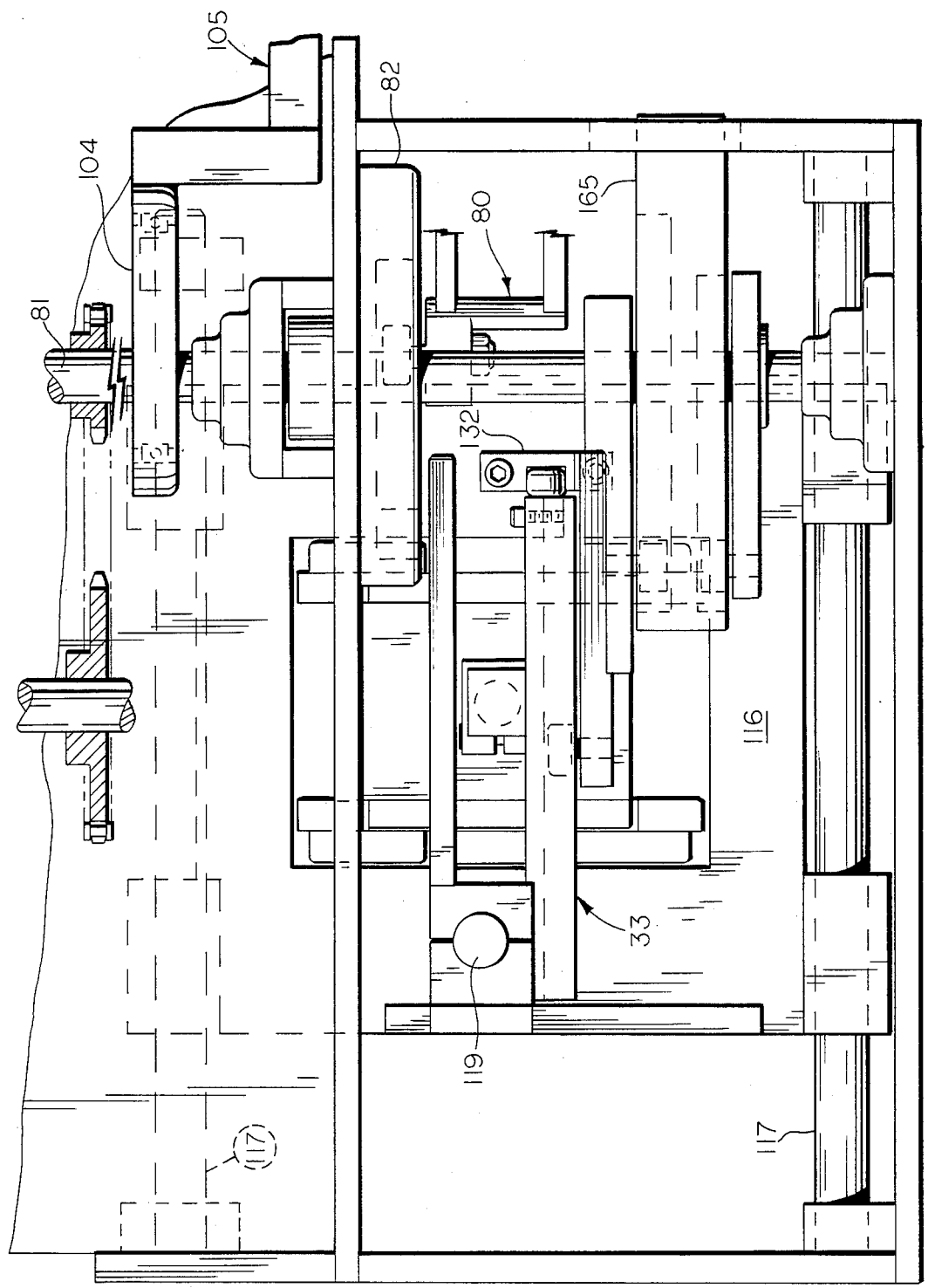
FIG. 25 is a top elevational view, showing the pressing means.
Figure 26:
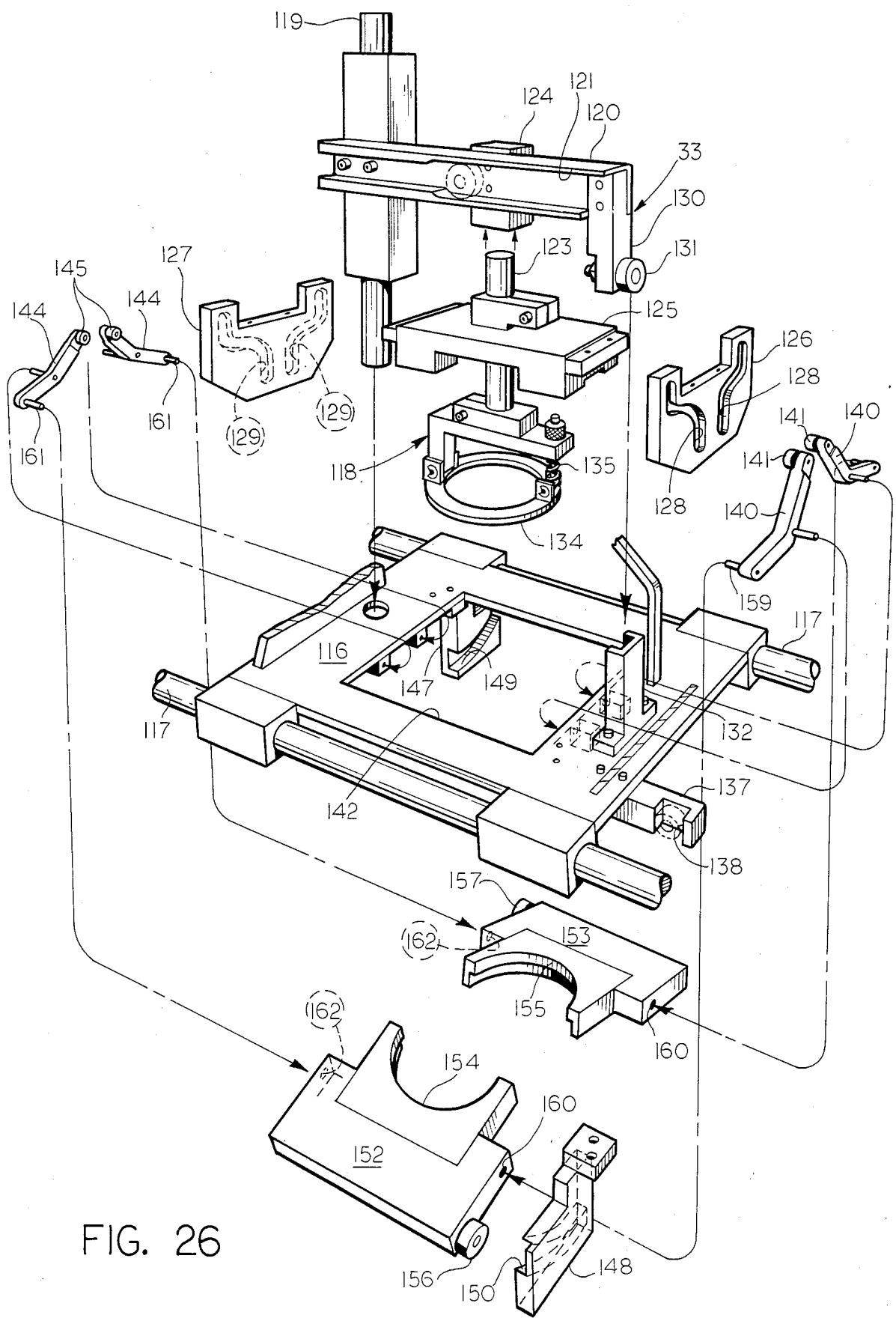
FIG. 26 is an exploded view showing varous components of the pressing means.

Referring to FIG. 10, a double sided cam member 165 is mounted on the shaft 81. The cam member 165 defines a cam path 166 on one side and a cam path 167 on the other side. A follower arm 168 has a follower 169 at one end which mates with the cam path 166. A drive roller 170 is mounted on the other end of the follower arm 168 and is received in the drive recess 138 defined in the drive arm 137. Rotation of the cam 165 reciprocates the flying table 116. Another follower arm 172 having a follower 173 is positioned partially behind the follower arm 168 as viewed in FIG. 22. The follower 173 of the follower arm 172 is received in the cam path 167 defined by the opposite side of the double sided cam member 165. The other end of the follower arm 172 mounts a drive roller 174 which is received in the track 121 defined by the horizontal strut 120. Rotation of the cam 165, through the follower arm 172, vertically reciprocates the horizontal strut 120 and the pressure head 118. The cross member 125 and the opposed cam members 126 and 127 are also vertically reciprocated as the pressure head 118 is reciprocated. This vertical movement of the cam members 126 and 127 pivot the camming arms 140 and 144 to close and open the jaws 152 and 153. This occurs as the pressure ring 134 moves downwardly to press the respective spouts 49 in a container 35 and then moves upwardly to recycle. As shown in FIGS. 23 and 24 when in the closed position, the jaw members 154 and 155 mate with the finish of the container 35 to hold and support the container finish during the pressing operation as the pressing ring 134 snaps the respective fitment or spout 49 into correct alignment and positioning. To be able to do this while the remaining containers 35 continue movement along the belt conveyor 34 is a major advantage of the fitment inserter machine 30, according to the present invention.

Many revisions may be made to the embodiments described above without departing from the scope of the following claims.

I claim:

1. A fitment inserter machine for inserting a fitment into a container having an opening for receiving such fitment, the machine comprising, conveyor means for serially moving a plurality of containers,
   placer means for placing a fitment at a container opening while such container is moving,
   and pressing means for pressing such fitment into such container opening while such container is moving,
   said pressing means including mating jaws for grasping and holding such container adjacent such container opening during pressing of such fitment, said fitment inserter machine further including a flying table mounted for movement adjacent said conveyor means, and wherein said presser means includes a presser head mounted on said table, said presser head moving at the speed of the bottles during pressing.

2. A fitment inserter machine, according to claim 1, wherein said placer means includes a dispenser for holding a vertical stack of such fitments, alignment means for rotating the lowermost fitment to a correct alignment, roller means for moving the inserts downwardly, a transfer arm assembly for removing the lowermost one of the fitments from the vertical stack, and a rotatable placer means for receiving the lowermost fitment and placing such fitment in a correct alignment into the opening of a moving container.

3. A fitment inserter machine, according to claim 2, wherein said rotatable placer includes a bevel gear, a plurality of planetary spindle assemblies having planetary gears meshing with said bevel gear, each of said planetary spindle assemblies including an outer end for receiving a lowermost fitment, such spindle assembly rotating relative to said bevel gear for placing such fitment into such container opening.

4. A fitment inserter machine, according to claim 3, including finger means on said outer end of said spindle assembly for receiving and maintaining such fitment in a correctly aligned position.

5. A fitment inserter machine, according to claim 3, including delay means for adjusting the relative speed of rotation of said spindle assembly relative to said bevel gear prior to placement of such fitment on such container.

6. A fitment inserter machine, according to claim 3, including a curvilinear guide chute positioned adjacent said bevel gear for receiving such fitment during movement from such vertical stack to positioning on such container.

7. A fitment inserter machine, according to claim 2, wherein said transfer arm assembly includes a transfer head, a parallelogram linkage mounting said head and cam means operatively connected to said parallelogram linkage whereby said head receives such lowermost fitment and delivers it to said rotatable placer means and returns to the next lowermost fitment in the vertical stack.

8. A fitment inserter machine, according to claim 1, including first cam means operatively connected to said table for reciprocating said table and second cam means for closing and opening said jaws and for vertically moving said presser head.

9. A fitment inserter machine for inserting a fitment into a container having an opening for receiving such fitment, the machine comprising, conveyor means for serially moving a plurality of containers;
placer means for placing a fitment at a container opening while such container is moving; and,
pressing means for pressing such fitment into such container while such container is moving, said pressing means including a flying platform mounted for movement adjacent the moving containers, a vertically movable head on said platform for pressing the fitment into the container opening, jaw means carried by said platform for grasping and holding the container portion adjacent said opening and means for closing said jaw means around said container portion and holding the jaw means closed while the moveable head is lowered to press said fitment into said container opening.

10. A fitment inserter machine for inserting a fitment into a container having an opening for receiving such fitment, the machine comprising, conveyor means for serially moving a plurality of containers,
placer means for placing a fitment at a container opening while such container is moving, said placer means including a dispenser for holding a vertical stack of such fitments, alignment means for rotating about the vertical axis defined by said stack the lowermost fitment in said stack to a correct alignment, roller means for moving the fitments downwardly, a transfer arm assembly for removing the lowermost one of the fitments from the vertical stack, and a rotatable placer means for receiving the lowermost fitment and placing such fitment in a correct alignment into the opening of a moving container,
and pressing means for pressing such fitment into such container opening while such container is moving,
said pressing means including mating jaws for grasping and holding such container adjacent such container opening during pressing of such fitment.

11. A fitment inserter machine, according to claim 10, wherein said rotatable placer includes a bevel gear, a plurality of planetary spindle assemblies having planetary gears meshing with said bevel gear, each of said planetary spindle assemblies including an outer end for receiving a lowermost fitment, such spindle assembly rotating relative to said bevel gear for placing such fitment into such container opening.

12. A fitment inserter machine, according to claim 11, including finger means on said outer end of said spindle assembly for receiving and maintaining such fitment in a correctly aligned position.

13. A fitment inserter machine, according to claim 11, including delay means for adjusting the relative speed of rotation of said spindle assembly relative to said bevel gear prior to placement of such fitment on such container.

14. A fitment insert machine, according to claim 13, including a driven shaft, wherein said delay means includes an eccentric mounted on said driven shaft, a follower arm assembly extending outwardly from said eccentric, said arm being operatively connected to said bevel gear, whereby rotation of said eccentric rotates said bevel gear to effectively delay movement of said spindle assembly at the time of placement of a fitment on a container.

15. A fitment inserter machine, according to claim 11, including a curvilinear guide chute positioned adjacent said bevel gear for receiving such fitment during movement from such vertical stack to positioning on such container.

16. A fitment inserter machine, according to claim 10, wherein said transfer arm assembly includes a transfer head, a parallelogram linkage mounting said head and cam means operatively connected to said parallelogram linkage whereby said head receives such lowermost fitment and delivers it to said rotatable placer means and returns to the next lowermost fitment in the vertical stack.

17. A fitment inserter machine, according to claim 10, wherein said alignment means includes a friction pad for engagement with the fitments in the vertical stack and cylinder means operatively connnected to said friction pad for moving said friction pad into and out of engagement with the fitments and for reciprocating said friction pad for rotating and aligning the lowermost fitment.

18. A fitment inserter machine for inserting a fitment into a container having an opening for receiving such fitment, the machine comprising, conveyor means for serially moving a plurality of containers.
   placer means for placing a fitment at a container opening while such container is moving;
   and pressing means for pressing each fitment into such container opening while such container is moving,
   said pressing means including mating jaws for gasping and holding such container adjacent such container opening during pressing of such fitment;
   said placer means including a dispenser for holding a vertical stack of such fitments, alignment means for rotating the lowermost fitment to a correct alignment, roller means for moving the fitments downwardly, a transfer arm assembly for removing the lowermost one of the fitments from the vertical stack, and a rotatable placer means for receiving the lowermost fitment and placing such fitment in a correct alignment into the opening of a moving container, said rotatable placer including a bevel gear, a plurality of planetary spindle assemblies having planetary gears meshing with said bevel gear, each of said planetary spindle assemblies including an outer end for receiving a lowermost fitment, such spindle assembly rotating relative to said bevel gear for placing such fitment into such container opening, delay means for adjusting the relative speed of rotation of said spindle assembly relative to said bevel gear prior to placement of such fitment on such container, said delay means including an eccentric mounted on a driven shaft, a follower arm assembly extending outwardly from said eccentric, said arm being operatively connected to said bevel gear, whereby rotation of said eccentric rotates said bevel gear to effectively delay movement of said spindle assembly at the time of placement of a fitment on a container.

19. A fitment inserter machine for inserting a fitment into a container having an opening for receiving such fitment, the machine comprising, conveyor means for serially moving a plurality of containers;
   placer means for placing a fitment at a container opening while such container is moving;
   and pressing means for pressing such fitment into such container opening while such container is moving;
   said pressing means including mating jaws for grasping and holding such container adjacent such container opening during pressing of such fitment,
   said placer means including a dispenser for holding a vertical stack of such fitments, alignment means for rotating the lowermost fitment to a correct alignment, roller means for moving the fitments downwardly, a transfer arm assembly for removing the lowermost one of the fitments from the vertical stack, and a rotatable placer means for receiving the lowermost fitment and placing such fitment in a correct alignment into the opening of a moving container, said alignment means including a friction pad for engagement with the fitments in the vertical stack and cylinder means operatively connected to said friction pad for moving said friction pad into and out of engagement with the fitments and for reciprocating said friction pad for rotating and aligning the lowermost fitment.

20. A fitment inserter machine according to claim 19, including sensor means operatively connected to said cylinder means for sensing the alignment of the lowermost fitment and for energizing said cylinder means to place the lowermost fitment into the correct alignment.

* * * * *